United States Patent [19]
Love et al.

[11] Patent Number: 5,905,852
[45] Date of Patent: *May 18, 1999

[54] DISTRIBUTED PRINT PROCESSING

[75] Inventors: Shaun Timothy Love, Lexington, Ky.; Bruce Alan Peltzer, Ithaca, N.Y.; Gregory John Sherwood; Steven Frank Weed, both of Lexington, Ky.

[73] Assignee: Lexmark International, Inc., Lexington, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,937

[22] Filed: Feb. 16, 1996

[51] Int. Cl.$^6$ ....................................................... G06F 15/00
[52] U.S. Cl. ............................................ 395/114; 395/112
[58] Field of Search ..................................... 395/114, 112, 395/109, 115, 117, 111, 101, 106, 107, 108, 821, 822, 828, 834, 840, 882, 892, 500; 358/468, 407; 707/911

[56] References Cited

U.S. PATENT DOCUMENTS

| | | | |
|---|---|---|---|
| 5,140,674 | 8/1992 | Anderson et al. | 395/112 |
| 5,146,544 | 9/1992 | Altham et al. | 395/115 |

FOREIGN PATENT DOCUMENTS

| | | | |
|---|---|---|---|
| 212 335 A2 | 3/1987 | European Pat. Off. | G06F 3/12 |
| WO 96/01449 | 1/1996 | WIPO | G06F 3/12 |

OTHER PUBLICATIONS

PostScript® Fax, Technical Overview, pp. 1–9, Aug. 1993, Adobe Systems, Inc.

*Primary Examiner*—Edward L. Coles
*Assistant Examiner*—Dov Popovici
*Attorney, Agent, or Firm*—Frederick H. Gribbell; John J. McArdle, Jr.

[57] ABSTRACT

Apparatus, system and method is provided in which a primary printer prepares print data for use by its resident print engine, or by an alternate printer. The primary printer includes subsystems for receiving original print data from a device, such as a computer or scanner, and for converting the original print data into a data format compatible with the alternate printer.

30 Claims, 2 Drawing Sheets

DISTRIBUTED PRINT PROCESSING

FIELD OF THE INVENTION

The invention relates to a computer system having multiple printing mechanisms, and more particularly, to a system in which a primary printing mechanism supplies print information to an alternate printing mechanism.

BACKGROUND OF THE INVENTION

The quality of the output generated by modern computer printing systems has increased greatly in recent years. Among the improvements seen are higher resolution, device independent color and contone (continuous tone) imaging. These advanced capabilities greatly increase the requirements for computing resources available to the printer controller. Included among these are requirements for greater amounts of main memory for storing data as well as a sophisticated control program and means to store it. These features add significantly to the cost of the printer.

One way to provide advanced functionality while maintaining low cost is to provide a host raster image processor (RIP). RIP is a program that generates a bit map of the image to be printed. This bit map is used by printing hardware to produce the printed page. Normally the RIP resides in the printer where it interprets commands received from the host computer. In the case of a host RIP, the print data is processed on the host computer and the resulting bit map is then sent to the printer. This means that the RIP makes use of the computing resources in the host computer rather than in the printer. Since the printer does not need to provide these resources, the printer can be simpler and cheaper to manufacture.

A host RIP suffers a number of disadvantages. For example, demanding computing resources from the host computer to perform the RIP function takes the computing resources away from the user. A host RIP can greatly increase the delay between when a user issues a command to print and when the user is able to use the computer again. Another disadvantage is that the host RIP must download the entire bit map to the printer. Modern printer data streams are based upon concise descriptions of a page. Downloading a full bit map involves transferring a much greater amount of data than the data required if the bit map is generated at the printer, thereby involving still more work for the host to perform, as well as tying up a communications channel for a longer period of time. In addition, some print mechanisms have strict time constraints on when the data must be available. For example, once a laser printer begins to print a page, all the data for that page must be available without interruption. Typical communications channels between the host and print mechanism cannot be relied upon to supply the data at exactly the correct rate, thereby requiring either buffers in the print mechanism or a dedicated real time communications circuit within the host. Even when a communication channel supports the time constraints for data to such print mechanisms, a typical data processing host cannot satisfy the time constraints. Guaranteed response to requests with real time constraints defines a particular class of processing known as "real time operating systems".

Low cost basic printers will often have only very limited capabilities. In some cases, such a printer may be upgraded by adding more advanced features. This has the shortcoming of requiring "upgradeability" to be part of the printer's initial design. This may require the inclusion of extra sockets or connectors, as well as a more complex design, or even the inclusion of empty space under the covers to provide room for upgrades. In addition, there are features which may be difficult or unsuitable to provide as upgrades, or may be incompatible with one another. For example, full color laser printers do exist, yet it may always be impractical to upgrade to this capability starting from a monochrome laser printer.

When new printing requirements cannot be satisfied by upgrading current hardware, the only apparent solution is to provide a multiple printing system. Each printer of the system operates independently of any other printer in the system, and therefore, has independent requirements for memory and control programs. For example, a user may require the use of both a laser printer and a color ink jet printer. If both of these printers were originally configured such that they could only interpret a less sophisticated data stream, upgrading the control program of one would not benefit the other. Similarly, if both printers are constrained by limited memory resources, adding memory to one will not benefit the other.

Printers typically include many subsystems, such as an input/output (IO) subsystem for handling communication, a controller, and a print engine. Typically, the printer receives a data stream from a computer through the IO subsystem, the controller processes the data stream to generate a bit map, and the controller sends the bit map to the print engine to form an image corresponding to the data stream on a print media.

During operation, the controller executes a printer control program designed with an understanding of the hardware constraints, or characteristics, of the hardware it is to control. Among these characteristics are resolution, print media size, color capability, binary vs. contone printing, etc. Some of these characteristics can be manipulated among a finite set of values, while other characteristics cannot be modified at all. For example, the size of the paper might be changed from letter size to legal size, but the print mechanism places an absolute upper limit on what sizes of print media can be supported.

The print engine dictates how many bit planes the bit map should contain. For example, a monochrome print engine uses only a single bit plane for each page. Print engines which produce color output require multiple bit planes in order to produce a multiplicity of colors, one for each primary color utilized by the print engine. For example, a print engine which uses the primary colors cyan, magenta, and yellow (CMY) requires three bit planes, and a print engine which uses the primary colors cyan, magenta, yellow, and black (CMYK), requires four bit planes.

Because these and other characteristics are determined by the print engine, they are either fixed or limited to a specific set of possible values. Thus, prior to the invention the controller of a printer would not configure the bit map using parameters outside of the range of values which are appropriate for the print engine of the printer. For example, the controller would not produce a bit map for a tabloid size page if the print engine is unable to handle media that large, or would not generate multiple bit planes if the print engine is monochrome.

SUMMARY OF THE INVENTION

The invention relates to apparatus, system and method in which a primary print mechanism prepares print data for use by an alternate printing mechanism. The primary print mechanism includes subsystems for receiving original print data from a device, such as a computer or scanner, and for converting the original print data into a data format compatible with the alternate printing mechanism.

A printing mechanism of the invention includes an input/ output unit having a first communications channel and a second communications channel. A controller is electrically coupled to the input/output unit. The controller is operable to receive original print data which arrives on the first communications channel of the input/output unit. The controller is further operable to convert the original print data into resident print data and to convert the original print data into alternate print data in the form of commands in a page description language. A print engine is electrically coupled to the controller for generating an image on a print media. The controller supplies the resident print data to the print engine, and the controller supplies the alternate print data to the input/output unit for establishing the alternate print data on an output of the second communications channel.

The printing mechanism of the invention may further include a memory unit for storing printing parameters of an alternate printing mechanism. The controller retrieves the stored printing parameters and uses the retrieved parameters in generating the alternate print data.

The controller can access printing parameters of an alternate printing mechanism via the first communications channel, or the second communications channel, and uses the printing parameters for generating the alternate print data. In preferred embodiments, the controller accesses the printing parameters of an alternate printing mechanism from the alternate printing mechanism. The controller converts the original print data into alternate print data. If necessary, the controller may first convert the original print data into a bit map which is then converted into alternate print data.

Thus, a printing system of the invention includes a first printer communicatingly coupled to a second printer, wherein the first printer prepares print data for use by the second printer, and wherein the first printer receives original print data from an external source and converts the original data into a data format defined by said second printer.

In one embodiment, the invention relates to a printer having a generating unit for generating alternate print data from original print data; and an input/output unit coupled to the generating unit, wherein the input/output unit supplies the alternate print data to an alternate print mechanism at a rate that satisfies the data timing requirements of the alternate print mechanism, such that the alternate print mechanism utilizes the alternate print data without buffering the alternate print data.

One method of the invention is directed to operating a primary printing mechanism, which includes the steps of receiving original print data; determining with the primary printing mechanism whether an alternative printing mechanism is selected for printing; and if the alternate printing mechanism is selected, generating with the primary printing mechanism alternate print data from the original print data which is in a data format required by the alternate printing mechanism, and if the alternate printer mechanism is not selected, then generating primary print data from the original print data which is in a data format required by the primary printing mechanism.

Other features and advantages of the invention may be realized from the drawings and the detailed description of the invention that follows.

DESCRIPTION OF THE PREFERRED EMBODIMENT

Figure 1:
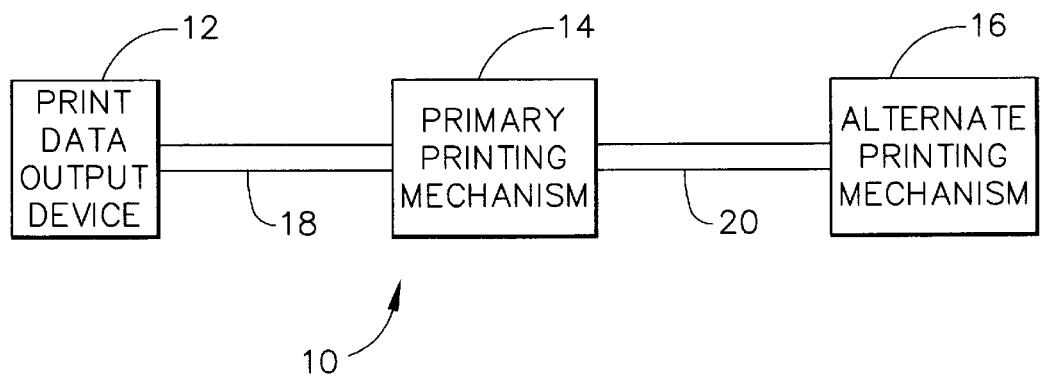
FIG. 1 is a general block diagram of a computer system embodying the invention.

FIG. 1 shows a printing system 10 embodying the invention. Computer system 10 includes a device 12 for generating original print data, such as for example, a computer, a scanner, or other such electronic and/or optical devices. System 10 further includes a primary print mechanism 14 and an alternate printing mechanism 16. Device 12 is electrically coupled to primary printing mechanism 14 via a bus 18, and primary printing mechanism 14 is electrically coupled to alternate printing mechanism 16 via a bus 20. Accordingly, communication between device 12 and alternate printing mechanism 16 is via bus 18, primary print mechanism 14, and bus 20.

As used herein, a "bus" may be any suitable conducting channel or path for transferring data signals, and includes for example, electrical conductor cables having one or more individual conductors, printed circuits, and optical cables. Furthermore, it is contemplated that bus 18 and/or bus 20 may be replaced by a transceiver system such as for example, an infrared transceiver system, or a network transceiver.

In preferred embodiments of the invention, primary printing mechanism 14 is a laser printer, and alternate printing mechanism 16 is an ink jet printer. The invention, however, is not intended to be so limited, and those skilled in the art will recognize that the print mechanisms 14 and 16 may include any electrophotographic, non-impact, or impact print engine.

Printing mechanism 14 includes means not only for accepting printing information from device 12 and for generating a data format suitable for use with its resident print engine, but also for accepting printing information and generating a data format appropriate for use with the alternate printing mechanism 16. Accordingly, the processing power of printing mechanism 14 can be used, for example, to configure a bit map suitable for use with the print engine of alternate printing mechanism 16. Thus, in this example, alternate printing mechanism 16 may, but need not, include means capable of generating the bit map for its resident print engine, since the bit map is generated in primary printing mechanism 14.

Figure 2:
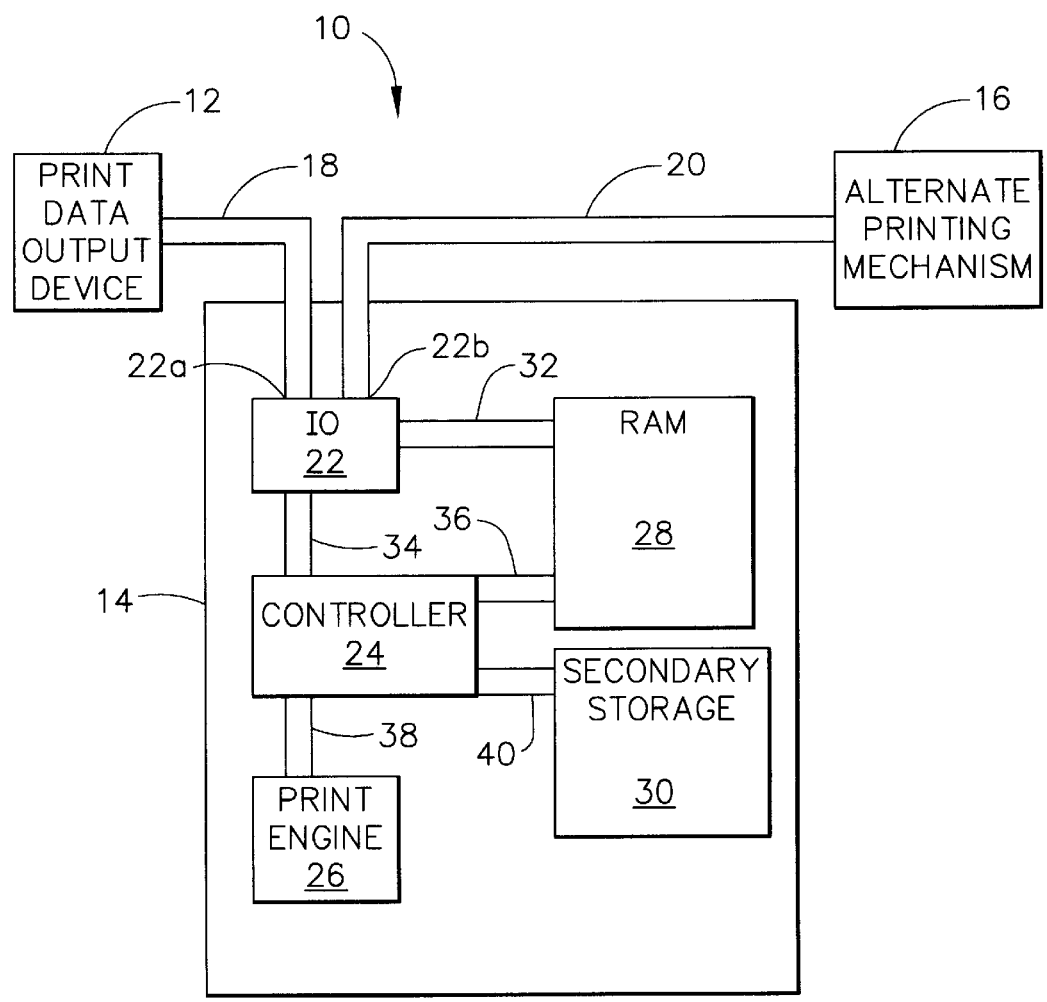
FIG. 2 is a more detailed block diagram of the computer system of FIG. 1.

FIG. 2 shows a more detailed block representation of the system 10 of FIG. 1. As shown in FIG. 2, primary print mechanism 14 includes an input/output (IO) subsystem 22, a controller 24, a print engine 26, a random access memory unit (RAM) 28 and, a secondary storage unit 30.

IO subsystem 22 is coupled to device 12 via a communications channel port 22a and bus 18. IO Subsystem 22 is also coupled to alternate printing mechanism 16 via a communications channel port 22b and bus 20. Internal to printer mechanism 14, IO subsystem 22 is electrically connected to RAM 28 via a bus 32, and is electrically connected to controller 24 via a bus 34. Controller 24 is further electrically coupled to RAM 28, print engine 26 and secondary storage 30 via a bus 36, a bus 38 and a bus 40, respectively. Internal busses 32, 34, 36, 38 and 40 preferably include conductors formed on a printed circuit board, although other communication paths, such as individual wire conductors, can be used.

IO subsystem 22 includes multiple communications channels and is responsible for communications into and out of printer 14, and has ports 22a and 22b coupled to corresponding communications channels for establishing, for example, serial, parallel, and network connections. IO subsystem 22 is also responsible for communication with an operator panel, (not shown). When connected to a network, printing mechanism 14 is associated with a particular network address, and data is communicated to printing mechanism 16 at a second network address via communications channel output port 22b.

Controller 24 includes a processor and firmware that controls each of the other subsystems 22, 26, 28 and 30 of printing mechanism 14. Controller 24 further receives data and print commands from device 12 via IO 22, and generates the data format, e.g. bit map, for use by print engine 26 or by alternate printing mechanism 16.

If the received data is intended for printing by printing mechanism 14, controller 24 then either sends the bit map directly to print engine 26 or to temporary storage in random access memory (RAM) 28. Ultimately, however, the print engine 26 receives the bit map and responds by outputting an image on a print media, such as a paper, mylar, etc. RAM 28 stores the bit map representation of the output image while it is being generated by controller 24 in preparation for delivery to print engine 26. If the storage capability of RAM 28 is large enough, while print engine 26 is working on one page, it is possible for controller 24 to be generating bit maps of subsequent pages for delivery to print engine 26 by storing them in RAM 28. RAM subsystem 28 preferably is expandable, and adding more memory improves the performance of printing mechanism 14 by allowing controller 24 to store greater quantities of bit map data in temporary storage.

In addition, increasing the size of RAM 28 provides more working memory for use in performing computations during generation of the bit map.

The secondary storage subsystem 30 may consist of disk drives and/or flash memory. It could be used, for example, for storing data such as fonts, and for spooling incoming page descriptions and generated output.

One of the primary responsibilities of controller 24 is to produce a bit map for delivery to print engine 26. The characteristics of print engine dictates to a large degree the format of the bit map it receives. For example, the characteristics of print engine 26 dictates the limits of the page dimensions and the resolution in dots per inch (DPI) associated with the bit map. The bit map delivered by controller 24 to print engine 26 must correspond to these parameters. For example, if print engine 26 is able to switch from 300 to 600 DPI, then the bit map generated by the controller and delivered to the print engine will need to have a corresponding change from 300 to 600 DPI.

As a secondary responsibility, however, controller 24 selects configuration values which, even though they may be inappropriate for resident print engine 26, are appropriate for alternate printing mechanism 16. For example, controller 24 not only is able to configure bit maps appropriate for 300 and 600 DPI resolution for use with print engine 26, but is also able to configure a bit map, for example, at 360 DPI resolution, suitable for alternate printing mechanism 16, even though such a bit map is unsuitable for print engine 26. This bit map would subsequently be used to generate print data for alternate print mechanism 16.

Referring to FIG. 2, IO subsystem 22 includes one or more communications channels which facilitate communications with alternate printing mechanism 16, thereby allowing the delivery of alternate print data produced by controller 24 and stored in RAM 28 to alternate printing mechanism 16 via port 22b. Communication between controller 24 and printing mechanism 16 can be unidirectional or bidirectional. In the bidirectional mode, controller 24 interrogates alternate printing mechanism 16 in order to determine appropriate parameter values for the configuration of a bit map suitable therefor. Thus, controller 24 is able to respond to input configuration signals from alternate printing mechanism 16, which in turn controller 24 uses to configure the bit map to the characteristics of alternate printing mechanism 16. This additional input signal indicates to controller 24 to use a set of printer parameters consistent with the requirements of printing mechanism 16. For example, if print mechanism 16 requires four color planes, then the bit map would be composed of four color planes, even if the resident print engine 26 is only capable of monochromatic output.

Thus, controller 24 receives input signals and configures itself to correspond to the physical characteristics of the print mechanism which is to provide the printed output. Accordingly, controller 24 may be configured to correspond to the characteristics of either primary print engine 26 or to the characteristics of alternate printing mechanism 16. Of course, controller 24 can be programmed to default to either configuration.

During the operation of system 10, input page description signals are sent by device 12 to a communications channel of IO subsystem 22 of print mechanism 14 via bus 18 and port 22a. The page description signals are then processed by controller 24 to generate bits in the bit map which are stored in RAM 28. Prior to the invention, if the print engine was monochrome and color page descriptions signals were received, color values would be mapped to gray values. In computer system 10, however, if alternate printing mechanism 16 is a color device and the mechanism 16 is selected for the current job, then color values are retained and a color bit map is generated and stored in RAM 28.

Before, or alternately after, the bit map is complete, IO subsystem 22 establishes a communication channel to alternate printing mechanism 16. Next, controller 24 sends signals to activate alternate printing mechanism 16 via port 22b and bus 20, controller 24 translates the bit map into appropriate commands for alternate printing mechanism 16, and controller 24 sends those signals to printing mechanism 16 via the communication channel coupled to port 22b of IO subsystem 22.

Alternate printing mechanism 16 may contain its own controller or controller 24 of primary printing mechanism 14 may be responsible for controlling all functions of printing mechanism 16. Depending upon the physical characteristics and processing capabilities of alternate printing mechanism 16, controller 24 either converts the bit map stored in RAM 28 into signals identical to those required to control the print engine of alternate printing mechanism 16, or converts the bit map stored in RAM 28 into a page description language (PDL) for use by the controller of printing mechanism 16. Accordingly, alternate printing mechanism 16 can be simply a second print engine or it could be a complete printer.

Figure 3:
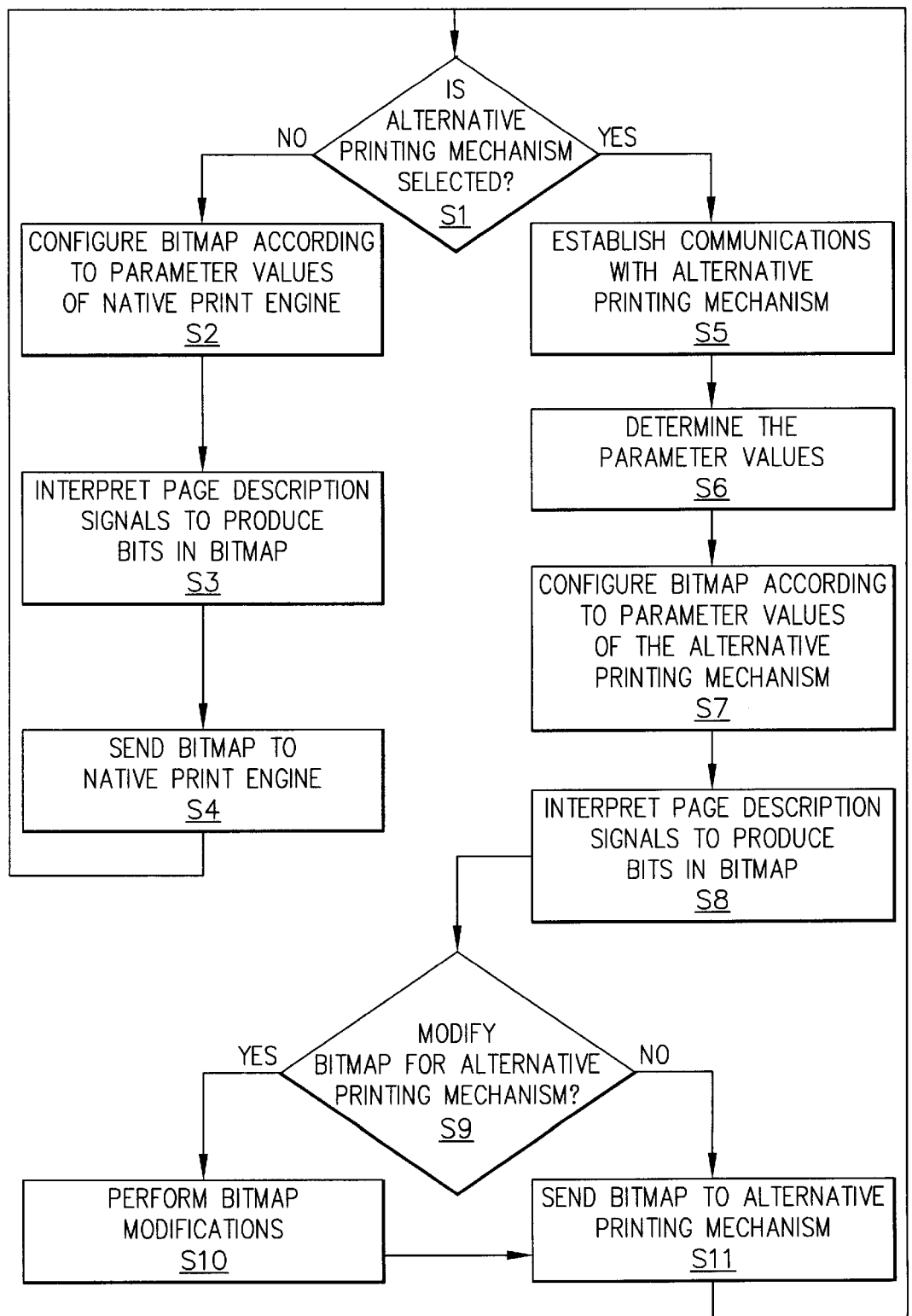
FIG. 3 is a flowchart of preferred operation steps performed by a controller of the invention.

FIG. 3 shows a flow chart indicating a preferred sequence of operation for controller 24 in generating a bit map and delivering it to the appropriate destination. In discussing this flow chart, reference will be made to the system elements shown in FIGS. 1 and 2. At step S1, a test is made to determine the presence of an alternate printer mechanism. If no alternate printing mechanism is selected, at step S2 controller 24 configures a bit map according to parameters of the resident print engine 26. Then, at step S3, controller 24 interprets page description signals received from device 12 to generate the bit map for the resident print engine 26, and at step S4 sends the bit map in bands to resident print engine 26 as the complete bit map is being generated. Controller 24 then returns to step S1 to test for selection of an alternate printing mechanism.

If alternate printing mechanism 16 is selected, then controller 24 executes step S5 to establish communications with alternate printing mechanism 16. The selection of an alternate printing mechanism may be accomplished through a front operator panel (not shown), by signals given in a control data stream from device 12, or automatically by determining that the signals received are not compatible with the characteristics of print engine 26.

The communication with alternate printing mechanism 16 may or may not be bidirectional. For example, if alternate printing mechanism 16 is a low end printer, it may not support bidirectional communications. In such a case, it is not possible for controller 24 to verify the communication link. Instead, the communication would either be verified by a human operator or assumed by controller 24.

Controller 24 proceeds to step S6 to determine the parameter values for alternate printing mechanism 16. In the event the communication is bi-directional, controller 24 interrogates alternate printing mechanism 16 to determine the appropriate configuration parameter values. If alternate printing mechanism 16 cannot provide parameter values, or if the communication is unidirectional, the parameter values are selected from a table of predetermined values stored in secondary storage 30 corresponding to those of alternate printing mechanisms 16 which are supported. At step S7, controller 24 uses the parameter values to configure the bit map, and at step S8 the page description signals are interpreted to place bits in the bit map storage locations in RAM 28. Once the bit map has been generated, at step S9 controller 24 determines whether it is necessary to modify the bit map prior to delivering it to alternate printing mechanism 16. If alternate print mechanism is a print engine relying upon controller 24 rather than a controller of its own, then the bit map may not need to be modified. Instead, controller 24 could send control signal to prepare print engine 16 and transfer the bit map using methods similar to those used to deliver bit maps to primary print engine 26. If it is determined that the bit map must be modified, controller 24 performs the necessary bit map modifications in step S10 and at step S11 controller 24 sends the modified bit map to printing mechanism 16. If it is determined that no modification of the bit map stored in RAM 28 is required, then controller 24 proceeds from step S9 to step S11 to send the stored bit map to alternate printing mechanism 16. The bit map is delivered by IO subsystem 22 to alternate printing mechanism 16.

Alternate printing mechanism 16 is not part of the native hardware in printing mechanism 14, and thus a wide variety of configurations of controller 24 are possible. The variations include, but are not limited to, the parameters mentioned already (resolution, page dimensions, number of bit planes). The alternate printing mechanism may also contain its own controller and thus be a printer in its own right. In such a case, the bit maps require conversion into signals appropriate to the controller residing in the alternate printing mechanism. For example, the alternate printing mechanism may be an ordinary printer capable of interpreting a PDL data stream.

Print controller 24 can convert the bit map into such a data stream easily by adding appropriate header information at the beginning of the page and prior to each scan line. This modified bit map is then delivered to alternate printing mechanism 16 via IO subsystem 22. Alternate printing mechanism 16 then responds to these signals just as it would to signals received from a computer and renders the image on media.

Alternatively, print mechanism 16 may be a simple engine without a controller or data buffers. In such a case, controller 24 must be capable of satisfying the timing requirements of alternate print engine 16 by supplying data at exactly the correct data rate. Provided that communications channel 20 has adequate bandwidth and consistent response time, alternate print mechanism 16 could be a print engine similar to print engine 26.

Thus, the invention permits the utilization of the processing and I/O capabilities of a primary printer in processing, and/or generating, and supplying data signals appropriate for use with an alternate printing mechanism. For example, a color ink jet printer could serve as an alternate printing mechanism to a monochrome laser printer, such that an otherwise monochrome printer now has color output capability. Furthermore, the alternate printing mechanism can reside in a remote location making it possible for bit maps to be generated locally in the primary printer, but output rendered remotely. This has advantages over the traditional use of multiple individual printers in that enhancements, such as expanding memory and adding secondary storage, need not be duplicated in each of the multiple printers. In addition, computing resources are concentrated in the primary printer, thereby allowing a basic alternate to benefit from the computing power of the primary printer.

As noted hereinabove, the printing mechanism of the invention 14 may include a memory unit 28 for storing printing parameters of an alternate printing mechanism 16. The controller 24 retrieves the stored printing parameters and used the retrieved parameters in generating the alternate print data.

The controller can access printing parameters of an alternate printing mechanism via the first communications channel, or the second communications channel, and uses the printing parameters for generating the alternate print data. In preferred embodiments, the controller printing mechanism. The controller converts the original print data into alternate print data. If necessary, the controller may first convert the original print data into a bit map which is then converted into alternate print data.

Thus, a printing system of the invention includes a first printer 14 communicatingly coupled to a second printer 16, wherein the first printer prepares print data for use by the second printer, and wherein the first printer receives original print data from an external source 12 and converts the original data into a data format defined by said second printer.

Although the invention has been described with reference to preferred embodiments, those skilled in the art will recognize that changes may be made in form and in detail without departing from the spirit and scope of the following claims.

We claim:

1. A printing mechanism, comprising:
   an input/output unit having a first communications channel and a second communications channel;
   a controller electrically coupled to said input/output unit, said controller being operable to receive original print data which arrives at an input of said first communications channel, said controller further being operable to convert said original print data into resident print data and to convert said original print data into alternate print data in the form of commands in a page description language, wherein said alternate print data is generated using printing parameters of an alternate printing mechanism; and a print engine electrically coupled to said controller for generating an image on a print media;

wherein said controller supplies said resident print data to said print engine, and wherein said controller supplies said alternate print data to said input/output unit for establishing said alternate print data at an output of said second communications channel.

2. The printing mechanism of claim 1, further comprising a memory unit for storing the printing parameters of said alternate printing mechanism, and wherein said controller retrieves said stored printing parameters and uses said retrieved parameters in generating said alternate print data.

3. The printing mechanism of claim 1, wherein said controller accesses the printing parameters of said alternate printing mechanism via said second communications channel and uses said printing parameters for generating said alternate print data.

4. The printing mechanism of claim 1, wherein said controller accesses the printing parameters of said alternate printing mechanism via said first communications channel and uses said printing parameters for generating said alternate print data.

5. The printing mechanism of claim 1, wherein said controller acquires the printing parameters of said alternate printing mechanism from said alternate printing mechanism, and uses said printing parameters for generating said alternate print data.

6. The printing mechanism of claim 1, wherein said controller converts said original print data into a bit map.

7. The printing mechanism of claim 6, wherein said controller modifies said bit map to generate said alternate print data.

8. The printing mechanism of claim 6, further comprising a memory unit for storing said bit map.

9. The printing mechanism of claim 1, wherein said first and second communications channels are connected to a communications network and wherein said printing mechanism is associated with a first address on said network and wherein said alternate print data is sent via said second communications channel to a second network address.

10. A printing system, comprising a first printer communicatingly coupled to a second printer, wherein said first printer prepares print data for use by said second printer, and wherein said first printer includes a processing circuit, a memory circuit, and a first communications port that receives original print data from an external source and converts said original print data into a data format defined by said second printer over a second communications port, wherein said converted print data is in the form of commands in a page description language.

11. A printing system, comprising:
a device for generating original print data; and
a primary printing mechanism including an input/output unit having a first communications channel and a second communications channel, wherein said first communications channel is communicatingly coupled to said device, said first communications channel receiving said original print data from said device, and having a controller for generating alternate print data from said original print data in a data format required for use by an alternate printing mechanism, and wherein said second communications channel of said primary printing mechanism is communicatingly coupled between said primary printing mechanism and said alternate printing mechanism, and wherein said controller acquires printing parameters for said alternate printing mechanism from said alternate printing mechanism, and generates said alternate print data in a data format defined by said alternate printing mechanism over said second communications channel, and wherein said alternate print data is in the form of commands in a page description language.

12. The printing system of claim 11, wherein said controller converts said original print data into a bit map.

13. The printing system of claim 12, wherein said controller modifies said bit map to generate said alternate print data.

14. The printing system of claim 11, wherein said device is a computer.

15. The printing system of claim 11, wherein said primary printing mechanism is a laser printer and said alternate printing mechanism is a color ink jet printer.

16. A method of operating a primary printing mechanism, comprising the steps of:
receiving original print data;
determining with said primary printing mechanism whether an alternate printing mechanism is selected for printing; and
if said alternate printing mechanism is selected, generating with said primary printing mechanism alternate print data from said original print data in a data format defined by said alternate printing mechanism;, and
if said alternate printing mechanism is not selected, then generating primary print data from said original print data which is in a data format required by said primary printing mechanism, and wherein said alternate print data is in the form of commands in a page description language.

17. The method of claim 16, wherein the step of generating said alternate print data further comprises the steps of:
determining printer parameters for said alternate printing mechanism; and
configuring a bit map according to said printer parameters.

18. The method of claim 16, further comprising the step of said primary printing mechanism establishing a communications channel with said alternate printing mechanism.

19. A method of operating a printing system, comprising the steps of:
receiving original print data with a primary printing mechanism;
receiving from an alternate printing mechanism a set of printing parameters pertaining to a data format for said alternate printing mechanism;
generating alternate print data with said primary printing mechanism from said original print data in a data format defined by said alternate printing mechanism, and wherein said alternate print data is in the form of commands in a page description language; and
outputting said alternate print data from said primary printing mechanism to said alternate printing mechanism.

20. The method of claim 19, further comprising the step of storing the printing parameters for said alternate printing mechanism in a memory unit of said primary printing mechanism.

21. The method of claim 19, further comprising the steps of:

converting said original print data into resident print data for use by said primary printing mechanism; and providing a print engine for generating an image on a print media, wherein a controller of said primary printing mechanism supplies said resident print data to said print engine and said controller supplies said alternate print data to said alternate printing mechanism.

22. The method of claim 19, further comprising the step of said primary printing mechanism converting said original print data into a bit map.

23. A printing mechanism, comprising:

an input/output unit having a first communications channel and a second communications channel;

a controller electrically coupled to said input/output unit, said controller being operable to receive original print data which arrives at an input of said first communications channel, said controller further being operable to convert said original print data into resident print data in the form of a bit map, which is then converted into alternate print data in the form of commands in a page description language; and a print engine electrically coupled to said controller for generating an image on a print media;

wherein said controller supplies said resident print data to said print engine, and wherein said controller supplies said alternate print data to said input/output unit for establishing said alternate print data at an output of said second communications channel.

24. The printing mechanism of claim 23, further comprising a memory unit for storing printing parameters of an alternate printing mechanism, and wherein said controller retrieves said stored printing parameters and uses said retrieved parameters in generating said alternate print data.

25. The printing mechanism of claim 23, wherein said controller accesses printing parameters of an alternate printing mechanism via said second communications channel and uses said printing parameters for generating said alternate print data.

26. The printing mechanism of claim 23, wherein said controller accesses printing parameters of an alternate printing mechanism via said first communications channel and uses said printing parameters for generating said alternate print data.

27. The printing mechanism of claim 23, wherein said controller acquires printing parameters of an alternate printing mechanism from said alternate printing mechanism, and uses said printing parameters for generating said alternate print data.

28. The printing mechanism of claim 23, wherein said controller modifies said bit map to generate said alternate print data.

29. The printing mechanism of claim 23, further comprising a memory unit for storing said bit map.

30. The printing mechanism of claim 23, wherein said first and second communications channels are connected to a communications network and wherein said printing mechanism is associated with a first address on said network and wherein said alternate print data is sent via said second communications channel to a second network address.

\* \* \* \* \*